(12) United States Patent
Boyd et al.

(10) Patent No.: US 12,060,865 B2
(45) Date of Patent: Aug. 13, 2024

(54) OPTICAL SYSTEMS AND METHODS FOR MEASURING TURBINE BLADE TIP CLEARANCE

(71) Applicant: Parker-Hannifin Corporation, Cleveland, OH (US)

(72) Inventors: Lewis J. Boyd, Larkhall (GB); Russell E. Altieri, Holly Springs, NC (US)

(73) Assignee: Parker-Hannifin Corporation, Cleveland, OH (US)

( * ) Notice: Subject to any disclaimer, the term of this patent is extended or adjusted under 35 U.S.C. 154(b) by 406 days.

(21) Appl. No.: 17/483,087

(22) Filed: Sep. 23, 2021

(65) Prior Publication Data

US 2022/0090582 A1 Mar. 24, 2022

Related U.S. Application Data

(60) Provisional application No. 63/082,591, filed on Sep. 24, 2020.

(51) Int. Cl.
*F03D 17/00* (2016.01)
*F01D 7/00* (2006.01)
(Continued)

(52) U.S. Cl.
CPC ............... *F03D 17/00* (2016.05); *F01D 7/00* (2013.01); *F01D 25/24* (2013.01);
(Continued)

(58) Field of Classification Search
CPC ..... F03D 17/00; G01B 11/14; G01B 9/02001; G01B 11/026; G01B 2290/25; F01D 7/00;
(Continued)

(56) References Cited

U.S. PATENT DOCUMENTS 3,899,921 A * 8/1975 Hockley ............... G01M 7/025
73/656
5,017,796 A * 5/1991 Makita ................... G01B 11/14
356/624
(Continued)

FOREIGN PATENT DOCUMENTS

CN 110887446 3/2020
CN 111220084 6/2020
(Continued)

OTHER PUBLICATIONS

Translation KR-100746340 (Year: 2007).*
(Continued)

*Primary Examiner* — Octavia Hollington
*Assistant Examiner* — Monica S Young
(74) *Attorney, Agent, or Firm* — Renner, Otto, Boisselle & Sklar, LLP (57) ABSTRACT

A blade tip measurement system includes a case and a blade that rotates within the case, the blade having an outer blade tip surface that has a clearance distance from an inner surface of the case. A light source emits light along an optical path that is directed toward the outer blade tip surface by a lens, and the outer blade tip surface reflects the light back along the optical path. An optical interferometer generates an interference pattern using the reflected light, and a photoreceiver receives the interference pattern. A complex logic device determines the clearance distance of the blade tip surface from the inner surface of the case based on the interference pattern. The interferometer may be a Fabry-Perot optical interferometer formed using a window positioned between the lens and the blade tip surface, or a Michelson interferometer formed using a reference optical path. The system may alternatively include an optical time of flight measurement of the blade tip clearance. The system further may include an abradable substrate having an optical (Continued)

fiber array of optical fibers at different depths, whereby the blade tip clearance is determinable based on which of the optical fibers are abraded as the blade tip rotates.

13 Claims, 5 Drawing Sheets

(51) Int. Cl.
　　*F01D 25/24* 　　(2006.01)
　　*G01B 9/02001* 　(2022.01)
　　*G01B 11/02* 　　(2006.01)
(52) U.S. Cl.
　　CPC ........ *G01B 9/02001* (2013.01); *G01B 11/026* (2013.01); *G01B 2290/25* (2013.01)
(58) Field of Classification Search
　　CPC ........ F01D 11/14; F01D 21/003; F01D 25/24; F05D 2270/804
　　USPC ...................................................... 73/112.01
　　See application file for complete search history.

(56) References Cited

U.S. PATENT DOCUMENTS

| | | | |
|---|---|---|---|
| 6,736,321 B2 * | 5/2004 | Tsikos ................ | G06K 7/10663 |
| | | | 235/462.14 |
| 7,400,418 B2 | 7/2008 | Haffner et al. | |
| 8,553,233 B2 * | 10/2013 | Newman ................ | G01N 25/00 |
| | | | 356/520 |
| 8,553,237 B2 | 10/2013 | Kominsky | |
| 9,778,125 B2 | 10/2017 | Pechstedt et al. | |
| 10,488,182 B2 * | 11/2019 | Onishi .................... | G01B 11/14 |
| 2006/0002789 A1 * | 1/2006 | Haffner ................. | G01B 11/14 |
| | | | 415/118 |
| 2006/0238775 A1 * | 10/2006 | Lopushansky ......... | G01B 11/14 |
| | | | 356/519 |
| 2010/0242293 A1 * | 9/2010 | Willett .................... | G01B 7/14 |
| | | | 33/501 |
| 2015/0033848 A1 | 2/2015 | Pechstedt | |
| 2015/0177132 A1 | 6/2015 | Pechstedt | |
| 2019/0033061 A1 * | 1/2019 | Onishi ................ | G01B 5/0014 |
| 2020/0182609 A1 * | 6/2020 | Fukuyama ............. | F01D 11/20 |

FOREIGN PATENT DOCUMENTS

| | | | | |
|---|---|---|---|---|
| CN | 116698406 A | * | 9/2023 | |
| EP | 0492381 | | 7/1992 | |
| EP | 0567981 A1 | * | 11/1993 | |
| JP | 2009019590 | | 1/2009 | |
| KR | 100746340 B1 | * | 8/2007 | |
| WO | WO-2016087453 A1 | * | 6/2016 | ............ F03D 17/00 |
| WO | 2019/110624 | | 6/2019 | |

OTHER PUBLICATIONS

Translation WO-2016087453 (Year: 2016).*
Translation EP-0567981 (Year: 1997).*
Translation CN-116698406 (Year: 2023).*

* cited by examiner

OPTICAL SYSTEMS AND METHODS FOR MEASURING TURBINE BLADE TIP CLEARANCE

FIELD OF INVENTION

The present application relates to measurement systems and methods that may be used to directly measure the blade tip clearance of a rotating compressor or turbine blade relative to a compressor or turbine case.

BACKGROUND

The clearance between the blade tips of the turbine blades in compressors and turbines in gas turbines for aerospace, marine propulsion, and power generation applications is a significant efficiency driver. For example, as a turbine blade in a gas turbine engine rotates, changes in temperature can cause the turbine blade, blade disc, or turbine case to expand and contract, resulting in a variation in a clearance of the turbine blade tips relative to the inner surface of the case in which the turbine blades rotate. For enhanced efficiency, it is desirable to minimize such clearance as the turbine operates. A cooling air flow is provided to actively control a level of expansion and contraction of the turbine blades versus the turbine case. More specifically, to minimize this clearance distance between the blade tips and the case in response to expansion and contraction, a cooling air flow is actively managed to achieve an optimum level of expansion versus contraction of the turbine case to minimize the blade tip clearance. Optimum clearance management, therefore, requires an accurate measurement of the blade tip clearance at any given moment, and measuring the blade tip clearance therefore is a significant part of an optimal active blade tip clearance management system.

Currently, there is no known in-service, real-time direct blade tip clearance monitoring technology deployed on any engine in practical usage. Numerous technologies have been proposed historically, including those based on magnetic fields, eddy currents, capacitance measurements, and optical approaches. Such proposed technologies, however, have proven difficult to implement in practice. A recent summary paper on the state of the art can be found in (Bing Yu, 2020): https://journals.sagepub.com/doi/pdf/10.177/0020294019877514. Previous optical sensor approaches have centered around measuring the intensity of a beam of light directed at the blade tip and reflected into a remote detector. Such intensity-based measurements are susceptible to deficiencies caused by such factors as long-term changes in the launch light, reflectivity of the blade tip which can change over time with use, light losses in the delivery and capture system, and other factors. An example of such an approach is described in Haselbauer, (EP 0492381, 1990). Other more complex optical techniques using doppler velocimetry have also been trialed, such as the approach described in Pfister T, Büttner L, Czarske J, et al.

Other optical techniques have been employed to measure the tip clearance indirectly, such as that described by Spiegelberg (US 2015/0345324A1). Here, Optical Frequency Domain Reflectometry is employed to detect changes in turbine case temperature and strain, and hence derive expansion data, which in turn can be correlated with blade tip clearance.

One difficult aspect of measuring blade tip clearance with current sensor technologies is the need to account for an abradable layer, sometimes referred to as a wear ring. The abradable layer is applied to the inner surface of the turbine case and is purposefully designed to wear during the life of the engine, in particular during the first few cycles of a given operation. Accordingly, the clearance measurement of most interest for the efficient operation of the engine is the clearance between the blade tip and the inner surface of the abradable layer. In the optical methods described in Bing Yu referenced above, the measurement being made is between the window for the light transmission and the blade tip, and therefore an accurate measurement of the blade tip clearance relative to the abradable layer is not obtained, which particularly is deficient insofar as the abradable layer thickness changes with the associated wear. Such deficiency is shared by numerous conventional optical measurement systems.

Conventional proposals for accounting for the abradable layer include a rub pin, as exemplified in Willett et al. (U.S. 2010/0242293). In such a system, a rub pin structure includes an array of electrical wires formed in an abradable substrate embedded in the broader abradable layer. The electrical wires form individual circuits of differing lengths. As the rub pin structure is abraded by the blade's rotation as the blade tip contacts the abradable structure, some electrical circuits will be broken depending on the depth of the wear. Based on which circuits are broken, the amount of abrasion can be determined. The rub pin approach only gives a quantized measurement of the amount of abrasion, from which the blade tip clearance is intended to be determined. This approach, however, requires high temperature electronic circuitry to detect changes in the abradable layer, which is difficult to implement in a typical engine environment.

SUMMARY OF INVENTION

There is a need in the art, therefore, for improved systems and methods to measure the clearance between the outer tip of a rotating compressor or turbine blade in a gas turbine engine or similar mechanical system, including accounting for clearance relative to an abradable layer. The present application discloses techniques that employ one or more of a Fabry-Perot optical interferometer, an optical time-of-flight measurement system, or a Michelson optical interferometer. The present application also discloses an enhanced system that employs a rub pin configuration for detecting and measuring abradable layer wear using optical fibers rather than conventional electrical circuits.

An exemplary blade tip measurement system includes a case in which one or more blades rotate, and a window through which the outer tip of a blade can be measured using optical techniques. The system further includes a light source that emits light, and a lens configured to direct the emitted light through the window to be incident on the outer tip surface of the blade, whereby the light is reflected off of the outer tip surface and back through the lens. A photoreceiver receives the reflected light, and a complex logic device calculates the distance between the window and the outer tip of the blade based upon the reflected light. The window may have a thickness d1 measured between an inner window surface and an outer window surface, and a thickness d2 can be defined between the inner window surface and the outer tip surface of the blade. Accordingly, the thicknesses d1 and d2 constitute optical cavities that form a Fabry-Perot interferometer, whereby light transmitted and reflected through the optical cavities by reflection off of the different surfaces of the outer blade tip and the window creates an interference pattern that is received by a photoreceiver.

Additionally or alternatively, in another exemplary blade tip measurement system the blade tip clearance can be measured using a Michelson interferometer formed using an optical path including the outer blade tip surface and a separate reference optical path, whereby a portion of light emitted from the light source is directed by a beam splitter towards a mirror and reflected back to form a reference optical path. The reflected light from the reference optical path and the light reflected from the outer tip surface of the blade are recombined to create an interference pattern that is received by a photoreceiver. A complex logic device calculates the distance between the lens and the outer tip surface of the blade based upon the interference pattern.

Additionally or alternatively, in another blade tip measurement system the blade tip clearance can be measured by a time of flight of optical energy of the emitted and reflected light along different lights paths including the outer tip surface of the blade versus surfaces of the window. Light paths of different distances, and lights paths that travel versus not travel through the window, will reach the photoreceiver at different times, from which the blade tip clearance further may be determined.

The exemplary blade tip measurement systems also may include an array of optical fibers embedded in an abradable substrate that is embedded in a broader abradable layer of the compressor or turbine case, such that a surface of the abradable substrate is flush with an inner surface of the abradable layer. The array of optical fibers may include a plurality of optical fibers having respective reflective elements and different lengths, such that when the outer tip surface of the compressor or turbine blade strikes the abradable substrate, the reflective element is removed from one or more optical fibers based upon how deep the blade abrades the abradable substrate. The complex logic device determines which optical fibers are still intact based upon a relative amplitude of optical energy reflected from the array of optical fibers to a photoreceiver, from which a distance between the outer tip surface of the blade and an inner surface of the abradable substrate further can be measured. Each optical fiber in the plurality of optical fibers may have an identifying feature which may be unique to that particular optical fiber, such as for example a fiber Bragg grating, to determine the optical fiber or fibers that are abraded and as to which the reflecting element has been removed.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Embodiments of the present application will now be described with reference to the drawings, wherein like reference numerals are used to refer to like elements throughout. It will be understood that the figures are not necessarily to scale.

The present application discloses improved systems and methods to measure the clearance between the outer tip surface of a rotating compressor or turbine blade in a gas turbine engine or comparable mechanical system relative to a case in which the blade rotates. In general, a blade tip measurement system includes a case and a blade that rotates within the case, the blade having an outer blade tip surface that has a clearance distance from an inner surface of the case. A light source emits light along an optical path that is directed toward the outer blade tip surface by a lens, and the outer blade tip surface reflects the light back along the optical path. An optical interferometer is formed between the outer surface of the lens and the end of the blade tip, which generates an interference pattern using the reflected light, and a photoreceiver receives the interference pattern. A complex logic device determines the clearance distance of the blade tip surface from the inner surface of the case based on the interference pattern. The interferometer may be a Fabry-Perot optical interferometer formed using a window positioned between the lens and the blade tip surface, or a Michelson interferometer formed using a reference optical path. The system further may include an abradable substrate having an optical fiber array of optical fibers at different depths, whereby the blade tip clearance is determinable based on which of the optical fibers are abraded as the blade tip rotates.

In the examples below, principles of the current application are described principally in connection with turbine systems. It will be appreciated, however, that the principles of the current application are equally applicable to any application in which blade tip clearance measurement is important, such as for example compressors and similar devices with rotating blades.

Figure 1:
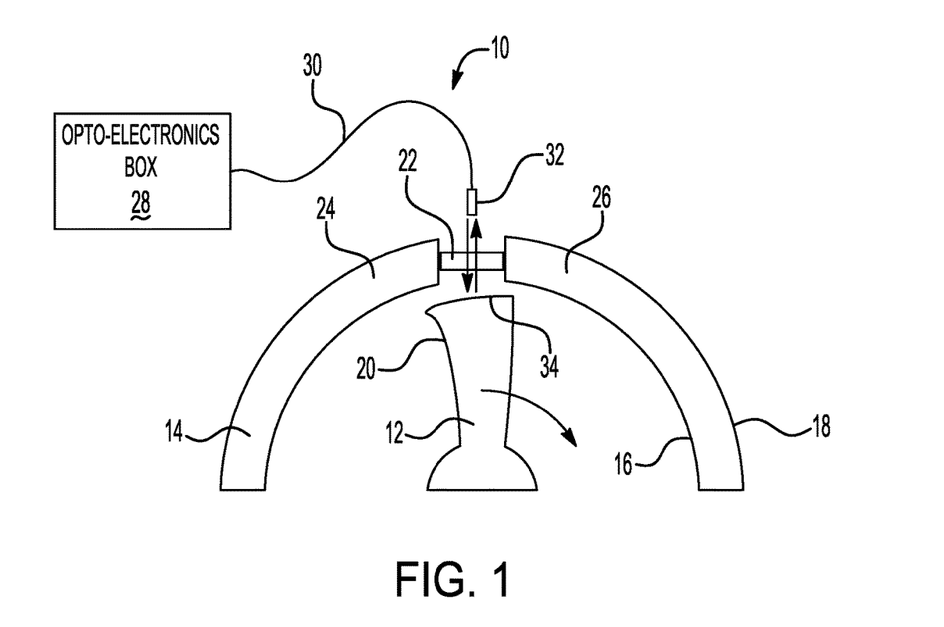
FIG. 1 is a drawing depicting an exemplary blade tip measurement system incorporating a Fabry-Perot optical interferometer for measuring blade tip clearance.

FIG. 1 is a drawing depicting an exemplary blade tip measurement system 10 incorporating an optical interferometer for measuring blade tip clearance. In the example of FIG. 1, the blade tip measurement system 10 more particularly employs a Fabry-Perot optical interferometer including the outer tip of the blade and a reference window, and light interference patterns can be measured remotely using white light interferometry from which blade tip clearance can be determined. As is known in the art, in general a Fabry-Perot optical interferometer uses the phenomenon of multiple beam interference that arises when light shines through optical cavities bounded by two partially reflective parallel surfaces. Light reflected off of different surfaces forms a measurable interference pattern with the incident light.

The blade tip measurement system 10 includes one or more rotating blades 12, such as for example turbine blade, compressor blades, or the like that rotate within a case 14, the rotation being indicated by the curved arrow in FIG. 1. For simplicity, only one turbine blade and a portion of the case is shown, but it will be appreciated that multiple blades may be employed that rotate within a full circumferential case. The case 14 includes an inner surface 16 on a blade side of the case and an outer surface 18 opposite from the inner surface 16. The blade 12 includes a blade tip 20, and as referenced above the current application is directed towards systems and methods for measuring a clearance between the blade tip 20 and the inner surface 16 of the case 14. A window 22 separates a first portion 24 and a second portion 26 of the case 14, and the window 22 is at least partially transmissive to light as represented by the arrows that pass through the window 22 in FIG. 1. The system 10 further includes a remote opto-electronics box 28 that generates and emits a light beam. An optical fiber 30 transmits the light to a lens 32 that is configured to direct the light though the window 22.

In this manner, optical energy from the remote opto-electronics box 28 is directed as a light beam to the blade tip 20 of the turbine blade 12 rotating within the case 14. The optical energy is transferred from the opto-electronics box 28 via the optical fiber 30 and collimated by the lens 32. The collimated light is thereby directed through the window 22 to be incident on an outer surface 34 of the blade tip 20. As further detailed below, the incident light is reflected off each opposing surface of the window 22 and the outer surface 34 of the blade tip 20. The reflected light then returns back through the same optical path to the opto-electronics box 28. In so doing, the incident optical energy from the opto-electronics box 28, and the reflected optical energy from the window 22 and the blade tip surface 34, will interfere with each other to create a measurable interference pattern.

To maintain operational integrity of the turbine system 10, the window 22 provides a gas and thermal seal relative to the case 14. Pressure and temperature loss from the engine core have a significant negative impact on engine performance, which is minimized or eliminated by the sealing function of the window 22. The window also provides a transparent optical path for the optical energy to enter the engine core defined by the case and reflected from the blade tip surface 34. The window also provides some partial reflection from at least one of its surfaces to form partial mirrors for operation as part of the optical interferometer. A suitable material for the window is sapphire, given its high temperature capability and durability. Other materials may be appropriate as are known in the art, which meet the light transmission/partial reflection and durability needs for any particular application. A typical thickness of the window may be on the order of 1-5 mm depending on the given application, and the window may be recessed 0.5-2 mm relative to the inner surface 16 of the case 14 to avoid damage to the window by rotation of the turbine blade 12. Material selection for the lens 32 may include, for example, sapphire or fused silica. A supporting structure for housing the lens in relation to the case wall may include high temperature ceramics such as for example Alumina, or metallics such as for example nickel or chromium based alloys (e.g., INCONEL®).

Figure 2:
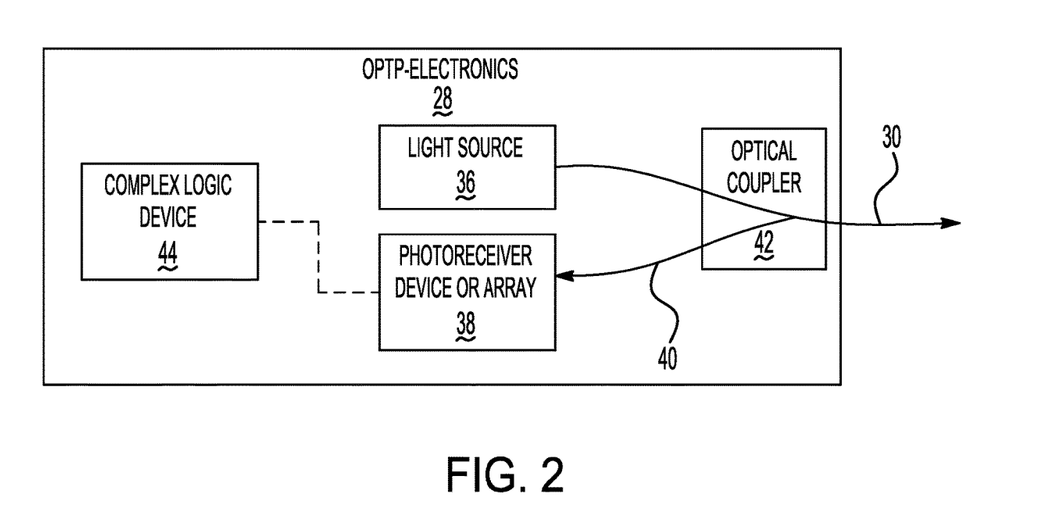
FIG. 2 is a drawing depicting a schematic block diagram of an exemplary opto-electronics box for use in the blade tip measurement system of FIG. 1.

FIG. 2 is a drawing depicting a schematic block diagram of an exemplary opto-electronics box 28 for use in the blade tip measurement system 10 of FIG. 1. Within the opts-electronics box 28, the light or optical energy is generated by a light source 36 and routed to the rest of the turbine system using standard optical components including the optical fiber 30. The reflected return light is routed and directed along the same, incident optical path (but in the opposite direction) and onto a photoreceiver device or array 38, or other suitable light sensor, via an internal optical fiber 40. An optical coupler 42 operates to control travel of the generated light from the light source 36 versus travel of the return light to the photoreceiver 38. The photoreceiver digitizes the return light that is reflected from the turbine blade tip surface 34 and the window 22, and digital signal processing is then performed by a complex logic device 44. The complex logic device 44 may be configured as any suitable electronic processor device such as a microprocessor, CPU, field programmable gate array (FPGA), or comparable control circuit that may execute program code stored on a non-transitory computer medium or other suitable electronic memory or storage device, and the complex logic device 44 may include any suitable circuitry, hardware, firmware, software, and the like as are known in the art of signal processing. The digitized data represents an interference pattern received by the photoreceiver, the interference pattern being formed by the interference of the incident light generated from the light source 36 and reflected light from the blade tip surface 34 and the window 22, from which spatial information relating to the position of the blade tip surface 34 relative to the window 22 within the case 14 can be determined.

The light source 36 may be a broadband light source, such as for example a light emitting diode (LED) or super-luminescent diode (SLD), or a laser whose output wavelength can be swept or tuned through a broad band of wavelengths. When a broadband light source is used, the photoreceiver device 38 is configured as an array containing numerous photoreceiver cells tuned or arranged to respond to different specific wavelengths within the full bandwidth of the broadband light source. Devices such as fiber Bragg grating analyzers (FBGAs) may be employed. When a swept or tuned laser is used, the photoreceiver device 38 may be a single photoreceiver cell such as a photodiode. Swept-wavelength lasers can be devices like a semi-conductor tuned laser or a multi-laser array. Tuned wavelength lasers can be formed from coupling laser diodes with an external tunable filter. Other methods known in art for creating a swept- or tuned-wavelength laser may be employed. The selection among these devices and options will be driven by cost, reliability in the environment of the opto-electronics box, and the required update rate of the system to measure the blade tip clearance adequately, for any given particular application.

Figure 3:
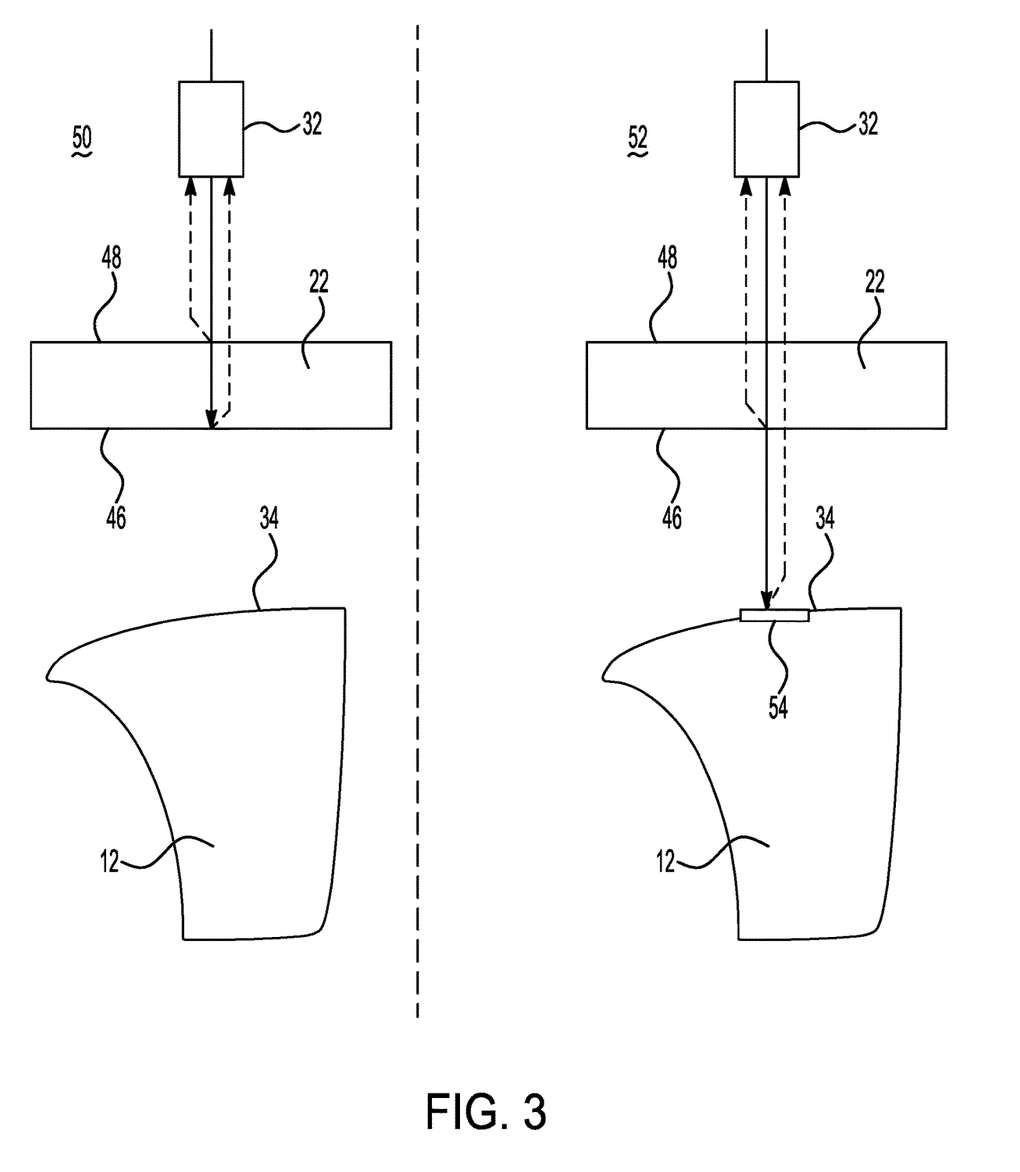
FIG. 3 is a drawing depicting the manner by which the blade tip measurement system of FIG. 1 forms multiple optical cavities to operate as a Fabry-Perot optical interferometer.

FIG. 3 is a drawing depicting the manner by which the blade tip measurement system 10 of FIG. 1 forms multiple optical cavities to operate as a Fabry-Perot optical interferometer. In particular, the window 22 and the blade tip surface 34 together form a multi-cavity Fabry-Perot optical interferometer. As identified in FIG. 3, the window 22 includes a blade side inner window surface 46 that faces the blade tip surface 34, and an outer window surface 48 opposite from the inner window surface 46. The arrows in FIG. 3 illustrate the optical pathways for light, with the solid arrows representing the incident light transmitted through the lens 32 to the window 22, and the dotted arrows representing reflected light that returns through the lens 32. The resultant interferometer contains two primary optical cavities. A first optical cavity 50 having a thickness d1 is formed between the outer window surface 48 and the inner window surface 46 of the window 22 (shown by the left portion of FIG. 3). A second optical cavity 52 having a thickness d2 is formed between the inner window surface 46 of the window 22 and the blade tip surface 34 (shown by the right portion of FIG. 3). Although shown separately in FIG. 3 for clarity of illustration, it will be appreciated that the first and second optical cavities 50 and 52 exist and operate simultaneously. As referenced above, the window thickness corresponding to d1 is on the order of 1-5 mm but will depend on the particular application. As part of an active clearance management system, the intent is to minimize d2, and thus the blade tip clearance, by use of a controlled cooling air flow (not shown) as referenced above in the background section. The interference pattern created relative to the incident light is then received by the photoreceiver 38.

The configuration of the blade tip surface 34 may be varied as appropriate for a given application or configuration of the optical components. Blade tip parameters that can be adjusted for performance needs, and/or for accommodating a particular configuration or positioning of the optical components, include flatness versus roughness of the blade tip surface, reflectivity of the blade tip surface and the surface angle relative to the incident light. Such parameters can be adjusted or optimized for correct light beam alignment and maximum reflection capture. A reflective surface finish also may be applied to enhance reflectivity of the blade tip surface. In an example depicted in the right side portion of FIG. 3, a reflective surface feature or finish may be applied to a specific location on the blade tip surface 34 to provide a dedicated reflection target 54 that maximally reflects the incident light as part of the second optical cavity 52.

Suitable processing techniques for digital signal processing by the complex logic device 44 may include the use of a Cross Correlation Function to compare the measured cavity thickness of d2 (the thickness of d1 is constant) with ideal software generated cavity spectra. Other techniques such as Fast Fourier Transforms (FFT) can also be applied. Using such techniques or comparable, the physical cavity thicknesses defined as d1 and d2 can be calculated. Thickness d2 represents the measurement of interest to the system for clearance management, and thickness d1 can be employed to generate useful reference information, which may include a measure of the temperature at the turbine or compressor case wall.

The position of the window 22 relative to the inner surface 16 of the case 14 and the blade tip 20 may be optimized for performance of the clearance measurement system. The window 22 may need to be set back from the inner surface 16 of the case 14, typically by about 0.5-2.0 mm depending on the application, to accommodate conditions in some engine operating systems in which the turbine blades can contact the case, and thus avoid damaging the window. As referenced above, the inner surface of the case may include an abradable layer (again, sometimes termed a wear ring) to allow for such operation. The window thickness d1 also is tuned according to the distance between the window and the blade tip surface 34. In setting these relative distances, the relative response of each of the interference patterns from the window and the blade tip surface are tuned commensurately, and an optical wavelength range to be used further may be selected for optimal performance in relation to the other system parameters.

The blade tip measurement system 10 having the configuration as depicted in FIGS. 1-3 also may be operated differently from an optical interferometer measurement apparatus. Additionally or alternatively, in another example the blade tip clearance can be measured by a time of flight of a short pulse of optical energy of emitted and reflected light along different lights paths including the outer tip surface of the blade versus surfaces of the window. Light paths of different distances, and lights paths that travel versus not travel through the window, will reach the photoreceiver at different times, from which the blade tip clearance may be determined.

Referring again to the configuration of FIGS. 1-3, in this example an optical energy pulse is generated from the light source 36 of the remote optoelectronics box 28, which is directed to the outer surface 34 of the blade tip 20 of the compressor or turbine blade 12 rotating within the case 14. Similarly as above, the optical energy is transferred from the optoelectronics box 28 via the optical fiber 30, and again is collimated by the lens 32. The collimated light is directed through the window 22 in the case 14 and onto the blade outer tip surface 34. Light is reflected off each of the inner window surface 46 and the outer window surface 48 of the window 22, and also is reflected off the blade tip surface 34. The reflected light returns back through the same optical path to the opto-electronics box 28, and the reflected return light is directed to a photoreceiver device or array 38 that digitizes the received light. Digital signal processing is then applied by the complex logic device 44 to determine a time of flight for the return light to reach the photoreceiver.

In this example that employs a time of fight measurement, the optical energy generated by the light source 36 is a short duration light pulse, such as on the order of less than one millisecond. The light pulse may be generated by a single narrow line width laser light source, or a broadband light source, provided the light source selected is capable of producing a sufficiently short pulse. The incident light pulse will reflect from each of the inner window surface 46, the outer window surface 48, and the blade tip surface 34. Each of these reflections will be received by the photoreceiver 38 at a different time. The difference in the time of receipt of each reflection by the photoreceiver 38 will relate to the travel distance and to the speed of light through the medium within which each incident and reflected light beam travels along the optical path to the photoreceiver relative to the location of each reflecting surface. In particular, light will travel more slowly through the sapphire window as compared to the air gaps between the system components. Using a high-speed detector system with sub-picosecond accuracy incorporated as part of the photoreceiver device, time delays of respective reflected light beams that travel different distances, and that travel versus not travel through the sapphire window, are detected. For example, light reflecting off the outer window surface 48 of the window 22 will not travel through the window 22 at all, whereas light reflecting off the blade tip surface 34 will travel through the window 22 twice (once each via the incident and reflecting light path direction). Accordingly, a time of travel may be employed to calculate a distance from the blade tip surface relative to one or both window surfaces, and then employed by the complex logic 44 to determine the blade tip clearance.

In considering the relative performance of using optical interference measurements as compared to time of travel measurements, in general interference measurements may be more suitable for relatively smaller distances between the window and the blade tip surface, whereas time of travel measurements may be more suitable for relatively larger distances. As both methods can be performed using the comparable structural configuration as depicted in FIGS. 1-3, a dual-operation sensing system may be employed that can use both forms of measurements to provide more accuracy. With such dual sensing capability, in another example interference measurements and time of travel measurements may be combined by the measurement system 10 to improve accuracy and/or to provide redundant measurements.

Figure 4:
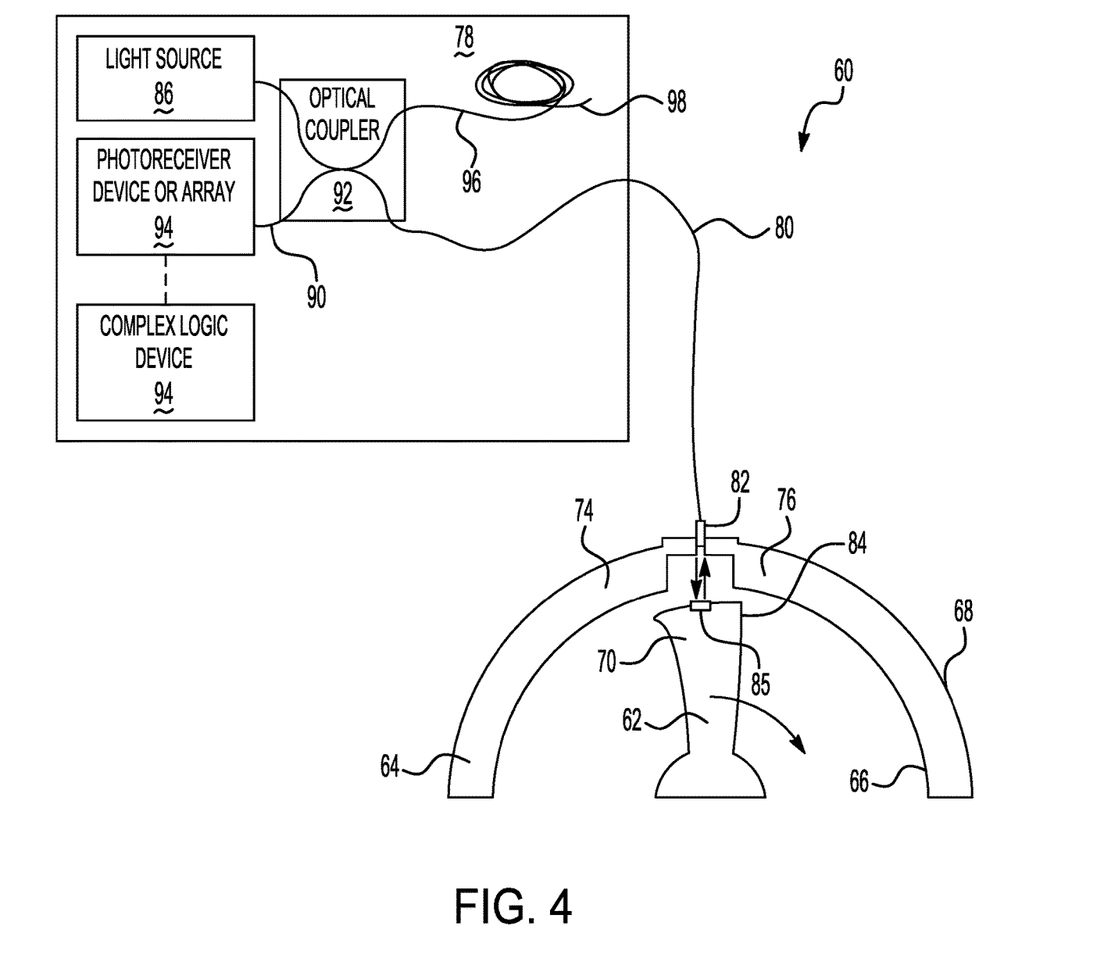
FIG. 4 is a drawing depicting an exemplary blade tip measurement system incorporating a Michelson optical interferometer for measuring blade tip clearance, formed by an optical path including the blade tip surface and a separate reference optical path associated with the opto-electronics box.

FIG. 4 is a drawing depicting another exemplary blade tip measurement system 60 incorporating another configuration of an optical interferometer for measuring blade tip clearance. In the example of FIG. 4, the blade tip measurement system 60 more particularly employs a Michelson optical interferometer that has an optical path including the blade tip surface and a separate reference optical path contained within or otherwise in signal communication with the opto-electronics box. Light interference patterns again can be measured remotely using white light interferometry from which blade tip clearance can be determined. As is known in the art, a Michelson interferometer employs two beams that are split from an originating beam that travel from the splitter device along different optical paths, which reflect back and recombine to create an interference pattern that may be registered and measured by a photoreceiver device. The split beam effect as employed in the system 60 can be achieved using optical fibers to form the different optical paths, in combination with a fiber-optic beam splitter, such as a combiner or splitter.

The overall structure of the turbine system 60 bears some similarity to the blade tip measurement system 10 of the previous embodiment. The blade tip measurement system 60 includes one or more blades 62, such as for example turbine or compressor blades, that rotate within a case 64, the rotation being indicated by the curved arrow in FIG. 4. Again, for simplicity, only one blade and a portion of the case are shown, but it will be appreciated that multiple blades may be employed that rotate within a full circumferential case. The case 64 includes an inner surface 66 on a blade side of the case and an outer surface 68 opposite from the inner surface 66. The blade 62 includes a blade tip 70, and as referenced above the current application is directed towards systems and methods for measuring a clearance between the blade tip 70 and the inner surface 66 of the case 64. The blade tip measurement system 60 further includes a remote opto-electronics box 78 that generates and emits a light beam. An optical fiber 80 transmits the light to a lens 82 that is configured to focus or direct the light onto an outer surface 84 of the blade tip 70. In this example, the lens 82 separates a first portion 74 and a second portion 76 of the case 64, and the lens material may be sapphire. The outer surface 84 also and optionally may include a dedicated reflection target 85 similarly as depicted in FIG. 4. A separate window is not employed for the Michelson interferometer configuration, and thus the lens 82 forms the thermal and pressure seal and barrier relative to the case wall.

Within the opto-electronics box 78, the light or optical energy is generated by a light source 86 and routed to the rest of the measurement system using standard optical components including the optical fiber 80. As indicated by the straight arrows in FIG. 4, the lens 82 directs light to the blade tip surface 84 and receives light reflected off the blade tip surface 84. The reflected return light is then routed and directed through the optical fiber 80 along the same, incident optical path (but in the opposite direction) and onto a photoreceiver device or array 88, or other suitable light sensor, via an internal optical fiber 90. An optical coupler 92 operates to control travel of the generated light from the light source 86 versus travel of the return light to the photoreceiver 88. The photoreceiver 88 digitizes the return light that is reflected from the turbine blade tip surface 84, and digital signal processing is then performed by a complex logic device 94.

In the configuration of a Michelson optical interferometer, the blade tip measurement system 60 further includes a reference optical fiber 96 that receives a portion of the light from the light source 86, which forms or constitutes a reference optical path. The reference optical fiber 96 includes a reflective end 98 that reflects light back to the photoreceiver 88. The reflective end 98 may be a mirror or comparable reflective device positioned at the end of the reference optical fiber 96. The optical coupler 92 further operates as a beam splitter to control the travel of the generated light from the light source 86 to the reference optical fiber 96 relative to the optical fiber 80 that transfers optical energy to the lens 92. Accordingly, the beam splitter/optical coupler 92 splits the light from the light source 86 to direct a portion of the light along the optical path and a portion of the light along the reference optical path. The reference optical fiber 96 may be located within the opto-electronics box 78 with the light source 86 as shown for example in FIG. 4, or otherwise may be located in signal communication with the light source 86 although not specifically positioned wholly within the opto-electronics box 78. The length of the reference optical path formed by the reference optical fiber 96 should have a length including incident and reflection paths that is substantially equivalent to a length of the total optical path distance between the light source 86 to the blade tip surface 84 and reflection back to the optical coupler 92.

In the configuration of a Michelson optical interferometer, the digitized data that is analyzed by the complex logic device 94 represents an interference pattern formed by the interference of the reflected light from the blade tip surface 84, and the reflected light along the reference optical path from the reflective end 98 through the reference optical fiber 96. Spatial information relating to the position of the blade tip surface 84 relative to the case 64 can be determined by an analysis of the interference pattern. Comparable analytical techniques referenced above as to the first embodiment, such as for example Cross Correlation Function and Fast Fourier Transforms (FFT), also may employed in connection with a Michelson optical interferometer configuration. It also will be appreciated that materials, dimensions, optimizations, and other variations that are described above with respect to components of the turbine system 10 are applicable to like or analogous components of the blade tip measurement system 60.

In this example, therefore, the Michelson optical interferometer is formed between the blade tip surface 84 and the separate reference optical path formed by the reference optical fiber 96. Optical energy traveling down the reference optical path is reflected from the reflective element or mirror 98 back through the reference optical fiber 96 towards the photoreceiver 88. The reflected light from the reference optical path is mixed with the light reflected back from the blade tip surface 84 along the optical fiber 80 at the optical coupler 92, which results in the generation of an interference pattern, and the resultant interference pattern is received by the photoreceiver 88 via the internal optical fiber 90. The resultant interference pattern between reflected light from the reference optical path and the reflected light from the blade tip surface is analyzed by the complex logic 94 to measure the blade tip clearance.

Another aspect of the exemplary blade tip measurement systems is an enhanced abradable substrate that is embedded in a broader abradable layer, whereby blade tip clearance additionally or alternatively may be determined based on abrasion of the abradable substrate. As further detailed below, the inner surface of the case includes an abradable substrate that is embedded within a broader abradable layer. The abradable substrate includes an optical fiber array including a plurality of individual optical fibers, each of the plurality of individual optical fibers of the optical fiber array having a respective end including a reflective element that receives light from the light source and reflects light back to the photoreceiver. The respective ends of the plurality of individual optical fibers of the optical fiber array are positioned at different depths within the abradable substrate relative to an inner surface of the abradable substrate, such that as the blade rotates within the case the outer blade tip surface abrades the abradable substrate so as to abrade one or more of the plurality of individual optical fibers of the optical fiber array according to how deep the blade tip surface abrades the abradable substrate, thereby removing respective reflective elements of the one or more of the plurality of individual fibers of the optical fiber array. The complex logic device measures an extent of abrasion of the abradable substrate based on optical energy of reflected light received by the photoreceiver from the optical fiber array, which aids in determining the clearance distance.

Figure 5:
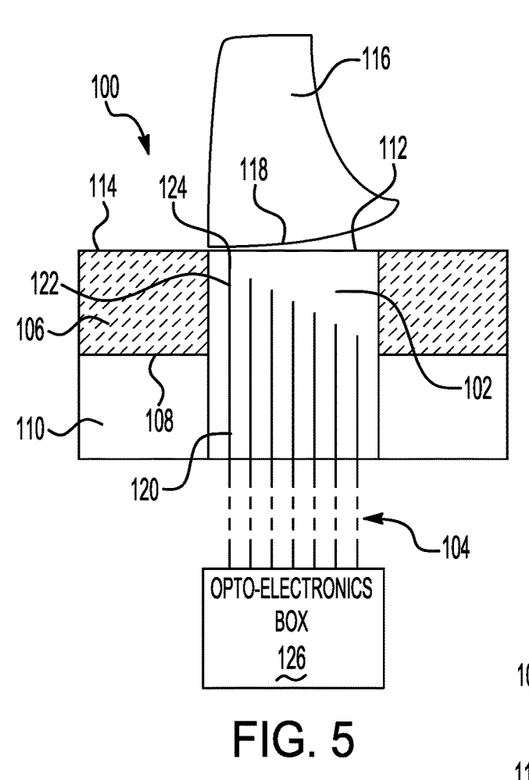
FIG. 5 is a drawing depicting a portion of an exemplary blade tip measurement system incorporating a rub pin structure including an array of optical fibers embedded in an abradable substrate.

FIG. 5 is a drawing depicting a portion of an exemplary blade tip measurement system 100 incorporating a rub pin structure including an array of optical fibers embedded in an abradable substrate. The blade tip measurement system 100 includes an abradable substrate 102 in which there is embedded an array of optical fibers 104. The abradable substrate 102 in turn is embedded within a broader abradable layer 106 that is applied to or incorporated as part of an inner surface 108 of a compressor or turbine case 110, whereby an inner, blade-side surface 112 of the abradable substrate 102 is flush with an inner, blade-side surface 114 of the abradable layer 106. The abradable substrate 102 is illustrated as positioned relative to a rotating blade 116 having an outer blade tip surface 118 similarly as the turbine blade of previous embodiments.

The array of optical fibers 104 includes a plurality of individual optical fibers 120, with each of the individual optical fibers 120 having a different length. As illustrated in FIG. 5, the differing lengths provide a configuration in which respective distal ends 122 of the individual optical fibers 120 are positioned at different distances from the inner surface 112 of the abradable substrate 102, Each distal end 122 of the respective optical fibers 120 includes a reflective element 124, such as a mirror. Any suitable number of individual optical fibers may be employed. The blade tip measurement system 100 further includes a remote opto-electronics box 126, and the opto-electronics box 126 is configured with like components as the opto-electronics boxes of the previous embodiments, including in particular a light source for generating optical energy, a photoreceiver device for receiving reflected optical energy, and a complex logic device for determining a blade tip clearance. The opto-electronic box 126 may be the same or a different opto-electronic box as described in previous embodiments.

When the outer blade tip surface 118 strikes the abradable substrate 102, a portion of the abradable substrate 102 will be removed. As more of the abradable substrate 102 is removed, individual optical fibers 120 are abraded whereby their respective reflective elements 124 will be removed according to how deep the blade tip surface abrades the abradable substrate. Generally, the longest optical fiber 120 will be abraded to remove its reflective element 124 first, followed by the next longest optical fiber, and so on. Optical energy is provided from the remote opto-electronics box 126 to the array 104 of optical fibers 120. Optical energy is reflected back from each optical fiber 120 in which the reflective element 124 remains intact. The reflected optical energy from the array of optical fibers is captured by the opto-electronics box 126 using the photoreceiver device and is digitized similarly as described above. The complex logic device within the opto-electronics box 126 then determines which optical reflective elements 124 are still intact from the relative amplitude of each signal from the individual optical fibers. In other words, the amount of optical energy received at the photoreceiver of the opto-electronics box 126 will vary depending upon the number of reflective elements that remain intact. From the level of optical energy received at the photoreceiver of the opto-electronics box 126, the complex logic device of the opto-electronics box 126 measures extent of abrasion of the abradable substrate, from which the blade tip clearance further is determined.

Figure 6:
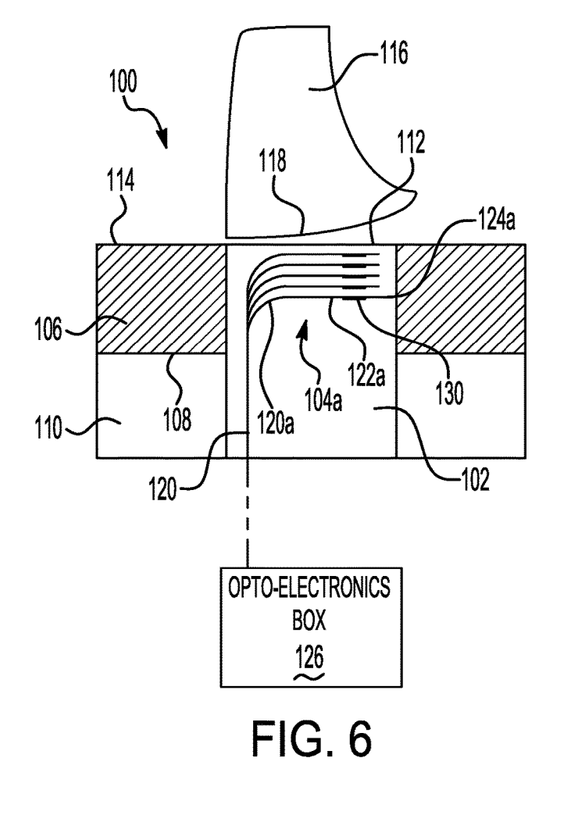
FIG. 6 is a drawing depicting a portion of an exemplary blade tip measurement system incorporating another configuration of a rub pin structure including an array of optical fibers embedded in an abradable substrate.

FIG. 6 is a drawing depicting the portion of the exemplary blade tip measurement system 100 incorporating another configuration of a rub pin structure including an array of optical fibers 104a embedded in the abradable substrate 102. In the previous example of FIG. 5, the individual optical fibers 120 in the array 104 run perpendicular to the inner surface 112 of the abradable substrate 102. In the example of FIG. 6, individual optical fibers 120a of the array 104a curve such that end portions 122a having reflective elements 124a extend parallel to the inner surface 112 of the abradable substrate 102. The array 104a of optical fibers 120a can extend from an originating optical fiber 121 using an optical fiber fan-out. In this manner, each of the individual optical fibers 120a is positioned at a different depth within the abradable layer 102 relative to the inner surface 112 of the abradable substrate 102, and thus at a different distance relative to the blade tip surface 118. In this example, each individual optical fiber 120a also has an identifying feature 130 that is unique to each optical fiber 120a, such as for example a fiber Bragg grating (FBG).

When the outer blade tip surface 118 strikes the abradable substrate 102, a portion of the abradable substrate 102 will be removed. As more of the abradable substrate 102 is removed, individual optical fibers 120a are abraded whereby their respective reflecting elements 124a and identifying features or FBGs 130 will be removed according to how deep the blade tip surface abrades the abradable substrate. Generally, the optical fiber 120a closest to the inner surface 112 of the abradable substrate 102 will be abraded to remove its reflecting element 124a and identifying feature 130 first, followed by the next closest optical fiber, and so on. Optical energy is provided from the remote opto-electronics box 126 to the array 104a of optical fibers 120a, and optical energy is reflected back from each optical fiber 120a in which the reflective element 124a remains intact. The reflected optical energy from the array of optical fibers is captured by the opts-electronics box 126 using the photoreceiver device and is digitized similarly as described above. The complex logic device within the opto-electronics box 126 then determines which optical fibers 120a are still intact, as the amount of optical energy received at the photoreceiver of the opto-electronics box 126 will vary depending the number of reflective elements 124a that remain intact. From the level of optical energy received at the photoreceiver of the opto-electronics box 126, the extent of abrasion of the abradable substrate is measured from which the blade tip clearance further is determined.

Figure 7:
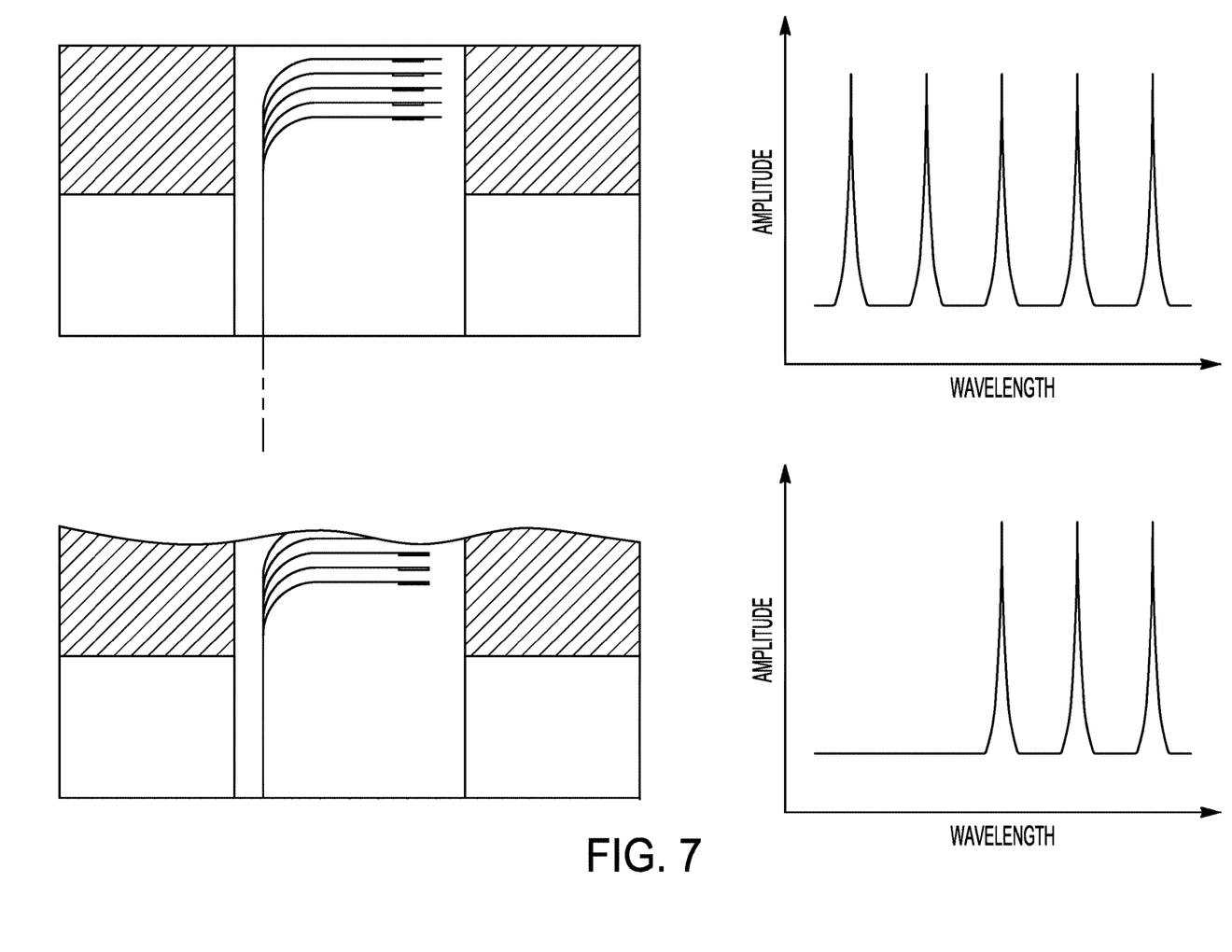
FIG. 7 is a drawing depicting the optical fiber array of FIG. 6, showing how the spectral signal from the optical fiber array varies with wear of the abradable substrate.

When using an FBG as the identifying feature 130, a grating may be written at a unique Bragg wavelength on each optical fiber 120a. Thus, by measuring the Bragg wavelength of the returned signal received at the photoreceiver, the complex logic device can better identify which optical fiber or optical fibers have been removed by the blade tip surface. FIG. 7 is a drawing depicting the optical fiber array of FIG. 6, showing how the spectral signal from the optical fiber array varies with wear of the abradable substrate. In the illustrated example of the five-fiber array of FIG. 6, FIG. 7 illustrates an exemplary spectral signal for all FBGs present versus the spectral signal when the two closest optical fibers are removed due to wear by the blade tip surface. From such spectral signal difference, the extent of abrasion of the abradable substrate is measured from which the blade tip clearance is determined. Although the described example employs FBGs as the identifying features 130, other suitable optical structures, such as dichroic mirrors, may be used to provide a similar unique identifying optical feature on each individual optical fiber.

In addition, the abrasion measurement further can be combined with the interferometer and/or time of flight measurements of previous embodiments, to provide a further enhanced measurement of blade tip clearance relative to the abradable layer.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above-described elements (components, assemblies, devices, compositions, etc.), the terms (including a reference to a "means") used to described such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A blade tip measurement system comprising:
a case and a blade that rotates within the case, the blade having an outer blade tip surface that has a clearance distance from an inner surface of the case as the blade rotates;
a light source that emits light along an optical path and a lens that receives the light and directs the light toward the outer blade tip surface, wherein the outer blade tip surface reflects the light back along the optical path;
an optical interferometer that generates an interference pattern using the reflected light;
a photoreceiver that receives the interference pattern;
a complex logic device configured to determine the clearance distance of the outer blade tip surface from the inner surface of the case based on the interference pattern;
a window, wherein the lens directs the light through the window toward the outer blade tip surface and the outer blade tip surface reflects the light back through the window; and
wherein the optical interferometer comprises multiple optical cavities formed by surfaces of the window and the outer blade tip surface, such that the reflected light creates an interference pattern with the light from the light source.

2. The blade tip measurement system of claim 1, wherein the multiple optical cavities include a first optical cavity between a blade side inner window surface and an outer window surface opposite from the inner window surface, and a second optical cavity between the inner window surface and the outer blade tip surface.

3. The blade tip measurement system of claim 1, wherein the complex logic device further is configured to determine time of flight measurements of reflected light that is reflected off the outer blade tip surface and the inner and outer window surfaces to the photoreceiver, and differences in time of flight to the photoreceiver further are used to determine the clearance distance.

4. The blade tip measurement system of claim 1, wherein the optical path includes an optical coupler and a first optical fiber that transfers the light from the light source to the lens, and a second optical fiber that transfers the interference pattern from the optical coupler to the photoreceiver.

5. The blade tip measurement system of claim 1, wherein the light source, the photoreceiver, and the complex logic are integrated into an opto-electronics box.

6. The blade tip measurement system of claim 1, wherein the outer blade tip surface includes a dedicated reflection target onto which the lens directs the light.

7. The blade tip measurement system of claim 1, wherein the light source is a broadband light source, and the photoreceiver is an array containing numerous photoreceiver cells tuned to different wavelengths within a full bandwidth of the broadband light source.

8. The blade tip measurement system of claim 1, wherein the light source is a swept or tuned laser and the photoreceiver is a single photoreceiver cell.

9. A blade tip measurement system comprising:
a case and a blade that rotates within the case, the blade having an outer blade tip surface that has a clearance distance from an inner surface of the case as the blade rotates;
a light source that emits light along an optical path and a lens that receives the light and directs the light toward the outer blade tip surface, wherein the outer blade tip surface reflects the light back along the optical path;
an optical interferometer that generates an interference pattern using the reflected light;
a photoreceiver that receives the interference pattern;
a complex logic device configured to determine the clearance distance of the outer blade tip surface from the inner surface of the case based on the interference pattern; and
a reference optical path and a splitter device that splits the light from the light source prior to any reflection by the blade tip surface, to direct a portion of the light along the optical path and a portion of the light along the reference optical path;
wherein the optical interferometer comprises the splitter device that also recombines reflected light that travels along the optical path and reflected light that travels along the reference optical to create the interference pattern.

10. The blade tip measurement system of claim 9, wherein the reference optical path includes a reference optical fiber that has an end with a reflective element.

11. A blade tip measurement system comprising:
- a case and a blade that rotates within the case, the blade having an outer blade tip surface that has a clearance distance from an inner surface of the case as the blade rotates;
- a light source that emits light and a photoreceiver that receives reflected light; and
- a complex logic device configured to determine the clearance distance of the outer blade tip surface from the inner surface of the case;
- wherein the inner surface of the case includes an abradable substrate that is embedded within an abradable layer;
- the abradable substrate comprising an optical fiber array including a plurality of individual optical fibers, each of the plurality of individual optical fibers of the optical fiber array having a respective end including a respective reflective element that receives light from the light source and reflects light back to the photoreceiver;
- the respective ends of the plurality of individual optical fibers of the optical fiber array being positioned at different depths within the abradable substrate relative to an inner surface of the abradable substrate that is initially aligned with the inner surface of the case, such that as the blade rotates within the case the outer blade tip surface abrades the abradable substrate so as to abrade one or more of the plurality of individual optical fibers of the optical fiber array according to how deep the blade tip surface abrades the abradable substrate, thereby removing respective reflective elements of the one or more of the plurality of individual fibers of the optical fiber array; and
- the complex logic device measures an extent of abrasion of the abradable substrate based on optical energy of reflected light received by the photoreceiver from the optical fiber array, and determines the clearance distance based on the extent of abrasion of the abradable substrate.

12. The blade tip measurement system of claim 11, wherein each of the plurality of individual optical fibers of the optical fiber array extends perpendicular to the inner surface of the abradable substrate.

13. The blade tip measurement system of claim 11, wherein each of the plurality of individual optical fibers of the optical fiber array is curved such that respective end portions of each of the plurality of individual optical fibers of the optical fiber array extend parallel to the inner surface of the abradable substrate; and
- the end portions of each of the plurality of individual optical fibers of the optical fiber array respectively includes an identifying feature that is unique to a respective individual optical fiber, whereby the complex logic determines the one or more of the plurality of individual optical fibers of the optical fiber array that are abraded based on removal of the respective identifying feature.

* * * * *